S. B. PECK.
COAL HANDLING DEVICE.
APPLICATION FILED MAY 15, 1908.
968,795.
Patented Aug. 30, 1910.
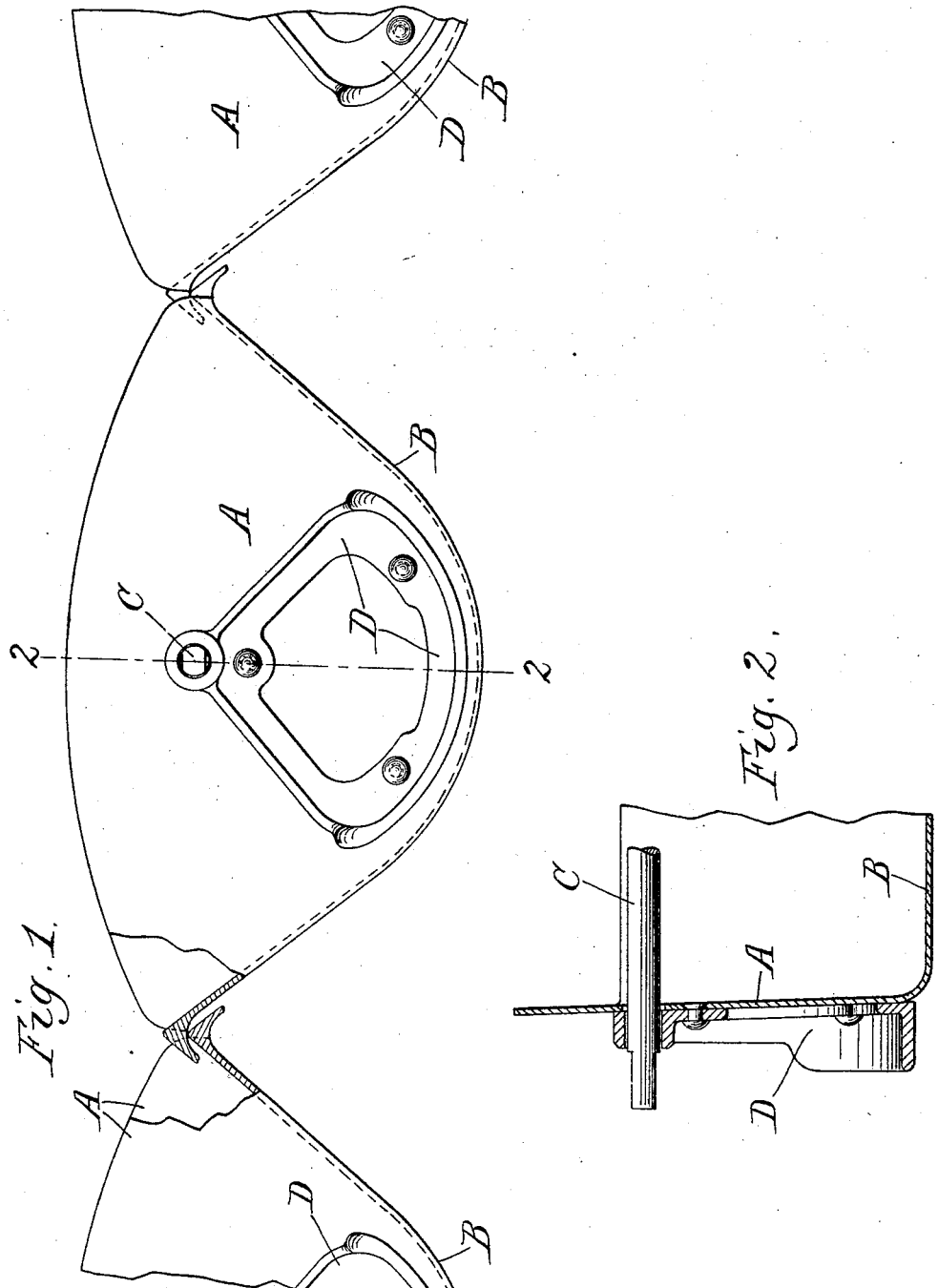
Witnesses.
Edward T. Wray.
Lucy A. Falkenberg
Inventor.
Staunton B. Peck,
by Parker & Carter
Attorneys.

UNITED STATES PATENT OFFICE.

STAUNTON B. PECK, OF CHICAGO, ILLINOIS.

COAL-HANDLING DEVICE.

968,795.  Specification of Letters Patent.  Patented Aug. 30, 1910.

Application filed May 15, 1908. Serial No. 432,989.

*To all whom it may concern:*

Be it known that I, STAUNTON B. PECK, a citizen of the United States, residing at Chicago, in the county of Cook and State of Illinois, have invented a certain new and useful Improvement in Coal-Handling Devices, of which the following is a specification.

My invention relates to coal handling devices and has for its object to provide certain new and useful improvements relating to endless chain conveyer bucket systems for coal and the like.

It is illustrated in the accompanying drawings, wherein—

Figure 1 is a side elevation of a series of such buckets with parts broken away; and Fig. 2 is a detail cross section on the line 2—2 of Fig. 1.

Like parts are indicated by the same letter in all the figures.

A, A are the ends of a bucket, the bottom of which is formed by the curved piece B. Each bucket is suspended on a short shaft C which is suitably mounted in the endless carrier. On the side of each bucket is preferably mounted a cam device D of any desired shape. In my system such cam device is used to tilt the bucket for unloading, or for any other purpose. I also preferably mount my buckets in the extended ends of links which form part of the endless carrier so as to bring about the disengagement of their overlapping lips as they pass about the corners, but as this is no part of my present invention I do not show it here. Buckets of this class, if the lips are overlapped, present a flat or rounded and relatively extended upper surface. A certain amount of material as, for example, coal, tends to rest and remain on such lip and to gather upon it. When, therefore, the lips separate, such coal so resting on the top of the lip is shaken off into the pit below. Moreover, if the buckets are well filled and the upper part of the upper lip is shaped as suggested, the tendency of the coal to gather upon the same may result in a spill of the coal at the end of such lip and between the sides of the bucket. If, on the other hand, these lips are made to present a sharp edge above or their two faces come together at a comparatively sharp angle, this tendency is entirely avoided. The bucket is under a certain amount of vibration and since there is nothing to induce the coal or other material to lie on or move about across the top or crest of the lip it tends to move downward on both sides and thus the crest is kept clear and the waste above referred to, or any other waste, is prevented. On the other hand, the buckets must have a certain freedom for longitudinal movement with reference to one another. This is important for several reasons, among others, because of the wearing of the parts, the movement of the buckets with reference to each other as they go around the corner, their coming together after the lips once being separated again approach each other, and the adjustment of the parts after the bucket has been emptied or dumped. To do this properly the lower side of the lip of the bucket should be flat or free from angles or recesses so that the edge of the lower lip may have the freedom of movement on the bottom of the upper lip. The form I have illustrated is shown in Fig. 1 where the lower arched surface of the lip covers the upper sharp edge on the lip of the adjacent bucket and rides upon it, but owing to the shape of said surface has a free movement thereupon.

To state the matter in another way, the configuration of the upper side of the lip should differ from that of the lower side so that when the upper side of one lip engages with the lower side of the other, the buckets shall have, while in effective engagement to prevent spill between the buckets, a certain freedom for longitudinal movement with reference to each other without displacement of the lips. The lips should not interlock though they must overlie each other and be in engagement. This feature of my invention could be realized without having the sharpened upper edge of the lip.

The preferred form of the structure comprises the relatively sharp upper edge of the lip, the overhanging outer edge of the lip, and the non-symmetrical shape of the upper and lower parts of the lip so that overlapping lips will shed the material in both directions from the crest, deliver it into the bucket of the underlying lip below the line of their engagement, and permit free longitudinal movement of the buckets with reference to each other. Of course the structure might be modified so as to throw away some one of these advantages while obtaining the others.

In my drawings I have shown the lower part of the lip as curved, but of course this curve could be broken into plane surfaces. It might even take the form of a single angle provided it formed a larger angle than the angle of the upper surface of the lip, or the upper surface of the lip might be itself somewhat curved or rounded. What I mean by "relatively smooth" therefore is a surface which is distinguished from a surface which is made to fit the opposed or lower surface. This explanation has reference not only to the possibility of longitudinal motion of the buckets, with reference one to the other, but it also has reference to the shape of the opposed surfaces of the lips so that they will easily engage and disengage which is not the case where they are symmetrical and closely fitting with a sharp angle on each.

I claim:

1. A conveyer bucket comprising a body having a lip at each end whose upper and lower surfaces are non-symmetrical with reference to each other, said lip projecting from said bucket and adapted to overhang a similar lip upon an adjacent bucket the upper surface of said lip comprising two flat surfaces at an angle one with the other.

2. A conveyer bucket comprising a body and a projecting lip at each end whose upper and lower surfaces are non-symmetrical with reference to each other, the upper surface presenting an upper relatively sharp edge.

3. A conveyer bucket comprising a body and a projecting lip at each end whose upper and lower surfaces are non-symmetrical with reference to each other, the lower surface presenting a relatively smooth surface.

4. A conveyer bucket comprising a body and a projecting lip at each end whose upper and lower surfaces are non-symmetrical with reference to each other, the upper surface presenting an upper relatively sharp edge and the lower surface presenting a relatively smooth surface.

5. A conveyer bucket comprising a body and a projecting lip at each end whose upper and lower surfaces are non-symmetrical with reference to each other, the lower surface presenting a relatively smooth upwardly arched surface.

6. A conveyer bucket comprising a body and a projecting lip at each end whose upper and lower surfaces are non-symmetrical with reference to each other, the upper surface presenting an upper relatively sharp edge, the lower surface presenting a relatively smooth upwardly arched surface.

STAUNTON B. PECK.

Witnesses:
EDWARD T. WRAY,
LUCY A. FALKENBERG.